Feb. 24, 1925.
J. S. MILLER
1,527,263
SAFETY DEVICE FOR AIRPLANES
Filed Aug. 15, 1924     4 Sheets-Sheet 1
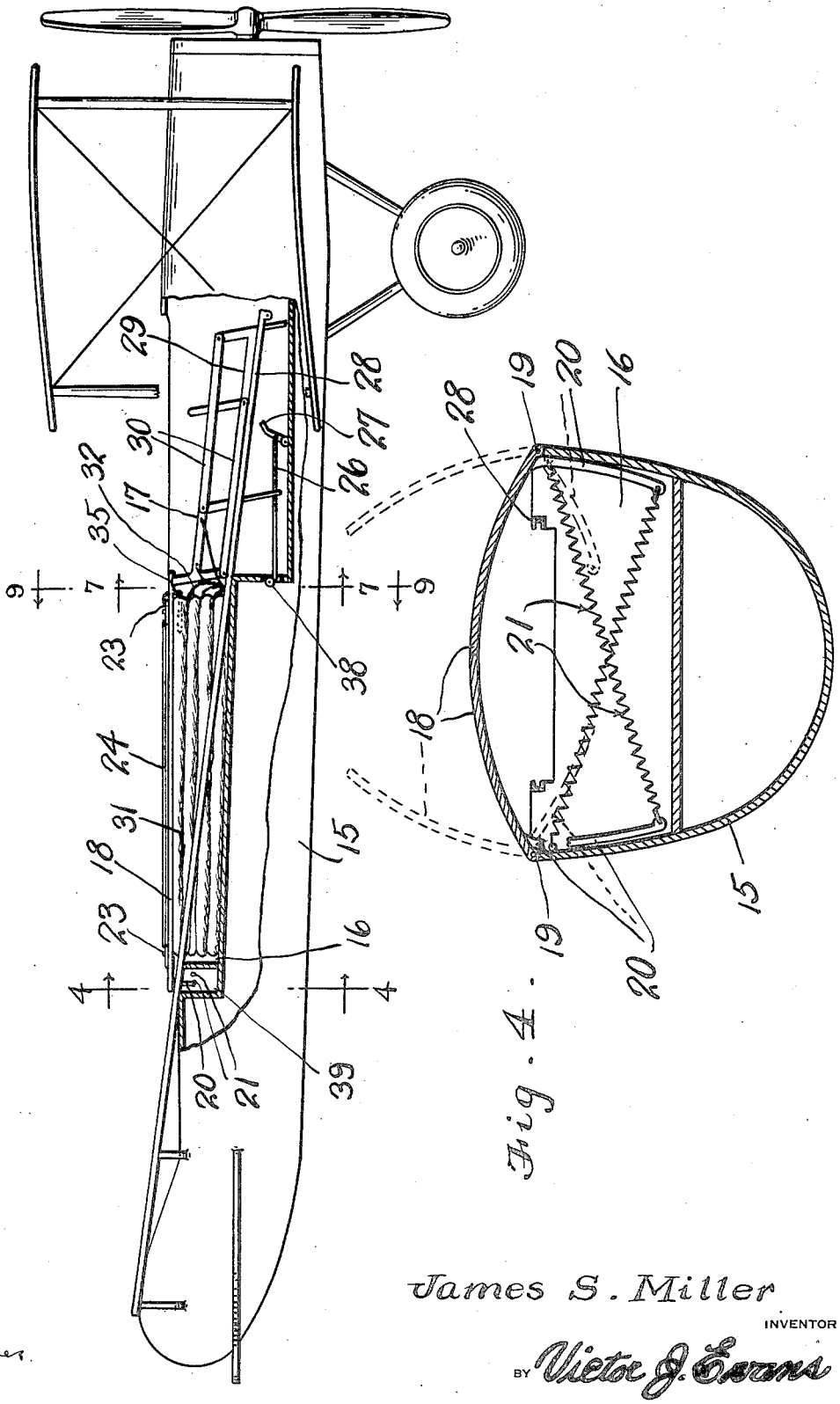
James S. Miller
INVENTOR
BY
ATTORNEY
WITNESS:

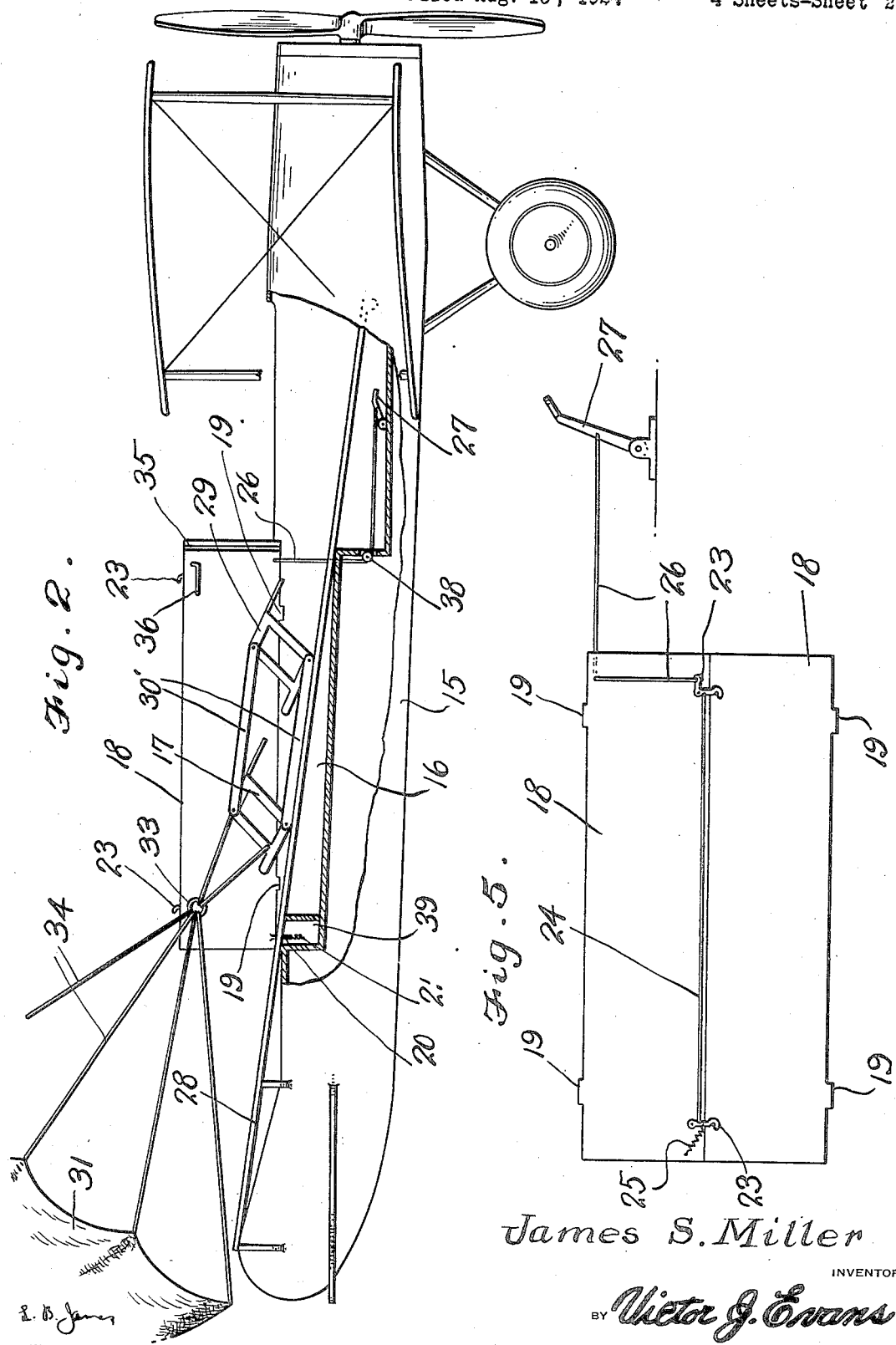

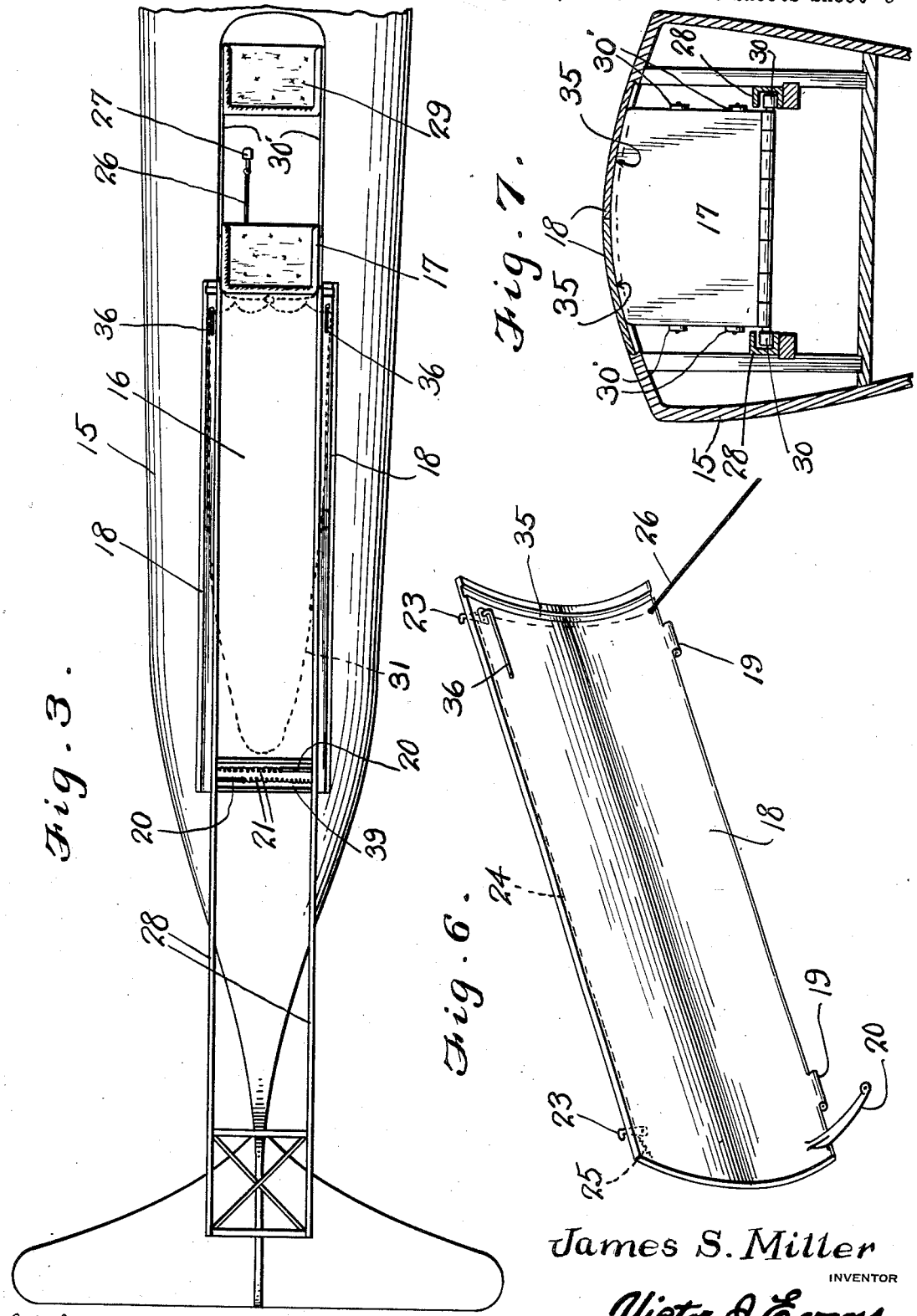

Feb. 24, 1925.  
J. S. MILLER  
SAFETY DEVICE FOR AIRPLANES  
Filed Aug. 15, 1924  
1,527,263  
4 Sheets-Sheet 4
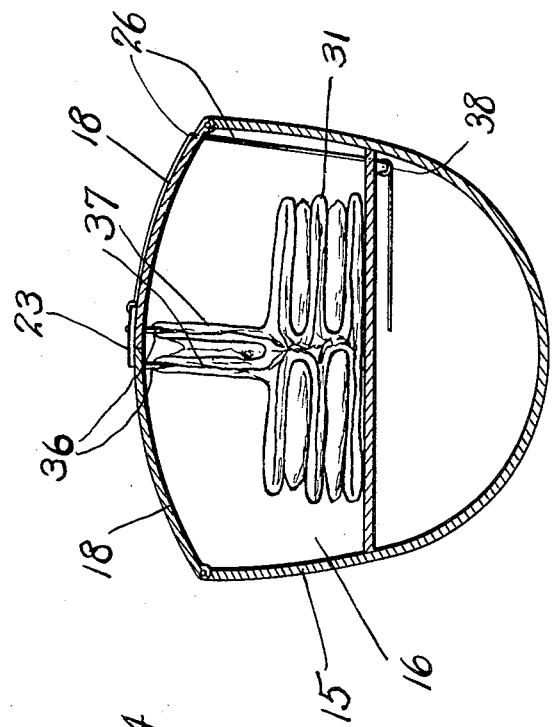
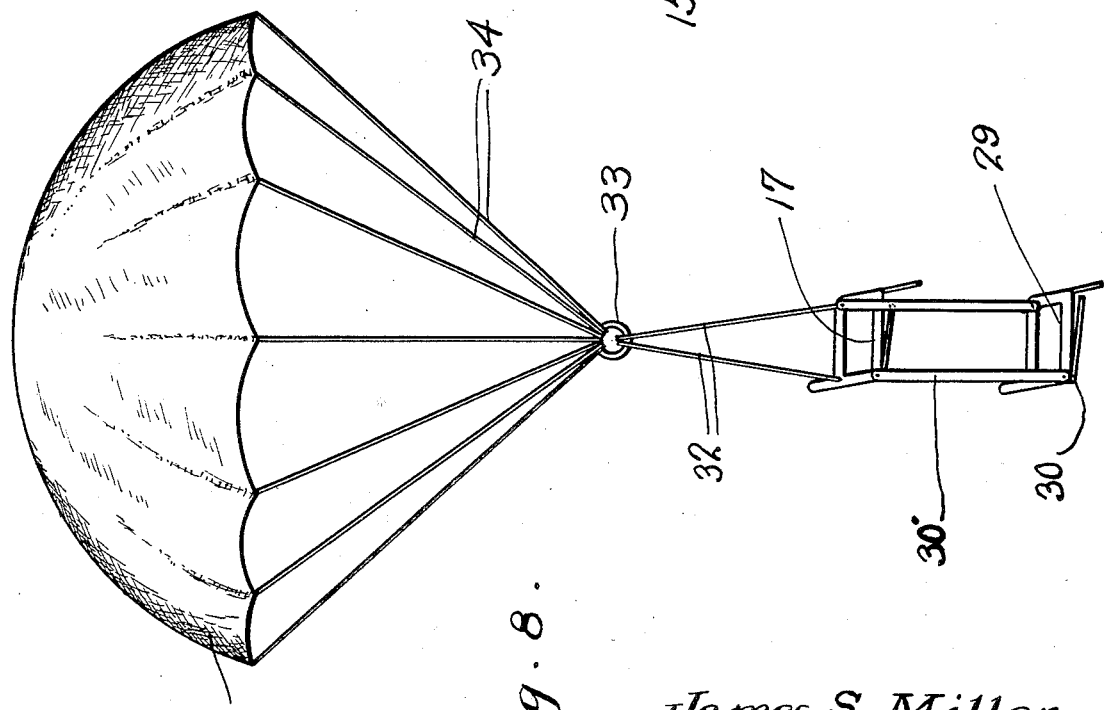
James S. Miller  
INVENTOR  
BY Victor J. Evans  
ATTORNEY
WITNESS:  
L. B. James Patented Feb. 24, 1925.

1,527,263

UNITED STATES PATENT OFFICE.

JAMES S. MILLER, OF BEDFORD, INDIANA.

SAFETY DEVICE FOR AIRPLANES.

Application filed August 15, 1924. Serial No. 732,229.

*To all whom it may concern.*

Be it known that I, JAMES S. MILLER, a citizen of the United States, residing at Bedford, in the county of Lawrence and State of Indiana, have invented new and useful Improvements in Safety Devices for Airplanes, of which the following is a specification.

This invention relates to safety devices for airplanes, an object being to provide means whereby the occupant or occupants of an airplane may be supported by a parachute in the event of accident (such as fire or wreck) so that the said occupant or occupants may descend slowly and safely.

To this end the invention aims to provide means for housing a parachute within a compartment provided in the fuselage of the airplane and for connecting the parachute with a removable seat or seats designed to be occupied by the aviator and passengers, together with means whereby the parachute and seats may be released and the said parachute simultaneously projected outward to insure its proper opening, whereby the occupant or occupants of the seats may slowly and safely descend independently of the airplane.

With the above and other objects in view, the invention further includes the following novel features and details of construction, to be hereinafter more fully described, illustrated in the accompanying drawings and pointed out in the appended claims.

In the drawings: -

Figure 1 is a side elevation partly in section showing an airplane equipped with the invention, parts being in normal or inactive position.

Figure 2 is a view similar to Figure 1 with the parachute projected outward for inflation and the seats moved partially rearward.

Figure 3 is a fragmentary top plan view with the parachute compartment open.

Figure 4 is an enlarged sectional view taken substantially on the line 4—4 of Figure 1, the parachute being removed and the doors of the parachute compartment shown by dotted lines in open position.

Figure 5 is a diagrammatic view illustrating the means for controlling the doors of the parachute compartment.

Figure 6 is a detail perspective view of one of the doors.

Figure 7 is a fragmentary sectional view taken substantially on the line 7—7 of Figure 1.

Figure 8 is an elevation showing the parachute and seats removed from the airplane with the seats in suspended position.

Figure 9 is a sectional view taken substantially on the line 9—9 of Figure 1.

Referring to the drawings in detail wherein like characters of reference denote corresponding parts, the invention is shown as applied to an airplane of the biplane type in which the fuselage is indicated at 15. This fuselage is provided with a longitudinally disposed compartment 16 which extends along the top of the fuselage, the forward end of the compartment being partly formed by the back of the aviator's seat indicated at 17. The compartment 16 is normally closed by a pair of doors 18 which are hingedly mounted as shown at 19 and are normally held in closed position.

For the purpose of automatically opening the doors, each door has extending therefrom an arm 20. These arms extend downwardly within the compartment 16 and are connected by springs 21 with the opposite side walls of the compartment. When the doors are released, the action of the springs will thus move the doors to an open position as illustrated by the dotted lines in Figure 4 of the drawings.

For the purpose of normally holding these doors in closed position there are provided pivotally mounted latches 23 which are secured to one of the doors and which engage pins or studs carried by the other door. These latches are connected by a cable or rod 24 to provide for their simultaneous operation and are yieldingly held in latched position by means of a spring 25. Secured to one of the latches 23 is one end of a cable 26 which extends forwardly and has its opposite end connected to a lever or foot pedal 27 which is mounted in the cock pit of the machine in advance of the aviator's seat so as to be within convenient reach.

Extending longitudinally upon opposite sides of the fuselage are channeled guide bars or rails 28, these rails supporting the aviator's seat 17 and if desired an additional seat 29. Both of these seats have extending laterally from opposite sides thereof rollers 30 which extend into and are movable along the rails 28 and act to support and hold the seats in position in a manner to permit of their being tilted or moved to the position shown in Figure 2 of the drawings. The seats are preferably connected by parallel rods 30' so that they will be simultaneously moved.

The rails extend through the compartment 16 and located within this compartment between the rails is a parachute 31. The open end of this parachute is disposed forwardly and is connected to the aviator's seat 17 by means of cables 32 which engage a ring 33 to which the ropes or cables 34 of the parachute are connected. The seats 17 and 29 may thus be suspended from the parachute.

The doors 18 are provided with transversely disposed grooves 35 and the back of the seat 17 is designed to fit within these grooves when the doors are closed so that the latter will act to hold the seats in their normal position and will release the seats when the doors are open.

Extending longitudinally along the inner forward edges of the doors 18 are arms 36 which are spaced beneath the doors and are adapted to enter folds 37 of the parachute 31 as shown in Figure 9 of the drawings so that when the doors are opened by the release of the latches, the forward end of the parachute will be projected upwardly and outwardly to receive sufficient air whereby the parachute will be extended and lifted from the compartment so as to carry with it the seats 17 and 29. As soon as the seats are released from the rails 28 they will assume a position one beneath the other supported by the parachute as shown in Figure 8 of the drawings.

The cable 26 preferably passes around guide pulleys 38, while the springs 21 and arms 20 are housed within a compartment 39 provided at rear end of the compartment 16. Thus, danger of the parachute becoming entangled with the arms or springs is avoided.

The invention is susceptible of various changes in its form, proportions and minor details of construction and the right is herein reserved to make such changes as properly fall within the scope of the appended claims.

Having described the invention what is claimed is:—

1. In an airplane, a removable seat, a compartment provided in the fuselage of the airplane at the rear of said seat and extending longitudinally of the upper portion of the fuselage, spring actuated doors for the compartment, means for normally holding the doors closed, means for locking the seat in the fuselage, a parachute within the compartment, and connected to the seat and means whereby the doors and seat may be simultaneously released to release the parachute.

2. In an airplane, a removable seat, a compartment provided in the fuselage of the airplane at the rear of said seat and extending longitudinally of the upper portion of the fuselage, spring actuated doors for the compartment, means for normally holding the doors closed, means included in the door holding means for locking the seat in the fuselage, a parachute within the compartment and connected to the seat and means whereby the doors and seat may be simultaneously released to release the parachute.

3. In an airplane, a removable seat, a compartment provided in the fuselage at the rear of said seat and extending longitudinally of the upper portion of the fuselage, spring actuated doors for the compartment, means for normally holding the doors closed, means for locking the seat in the fuselage, a parachute within the compartment and connected to the seat, said parachute being arranged with its open end forward, means whereby the doors and seat may be simultaneously released and means operated by the doors for projecting the forward open end of the parachute outward when the doors are open.

4. In an airplane, a removable seat, a compartment provided in the fuselage at the rear of said seat and extending longitudinally of the upper portion of the fuselage, spring actuated doors for the compartment, means for normally holding the doors closed, means for locking the seat in the fuselage, a parachute within the compartment and connected to the seat, said parachute being arranged with its open end forward, means whereby the doors and seat may be simultaneously released and means carried by the doors and engaging the parachute for projecting the forward open end of said parachute outward when the doors are open.

5. In an airplane, a removable seat, a compartment provided in the fuselage at the rear of said seat and extending longitudinally of the upper portion of the fuselage, spring actuated doors for the compartment, means for normally holding the doors closed, means for locking the seat in the fuselage, a parachute within the compartment and connected to the seat, said parachute being arranged with its open end forward, means whereby the doors and seats may be simultaneously released and longitudinally disposed arms extending from the doors beneath the forward end of the parachute for projecting said end outward when the doors are open.

7. In an airplane, a removable seat, a compartment provided in the fuselage at the rear of said seat and extending longitudinally of the upper portion of the fuselage, hinged doors for the compartment, arms extending from the doors within the compartment, a spring connecting the arms for forcing the doors to open position, means for normally holding the doors closed, means for locking the seat in the fuselage, a parachute within the compartment and connected to the seat and means whereby the doors and seat may be simultaneously released.

In testimony whereof I affix my signature.
JAMES S. MILLER.